United States Patent
Katsumata

(10) Patent No.: US 9,042,070 B2
(45) Date of Patent: May 26, 2015

(54) OVERCURRENT PROTECTION CIRCUIT AND POWER SUPPLY DEVICE

(71) Applicant: KABUSHIKI KAISHA TOSHIBA, Minato-ku, Tokyo (JP)

(72) Inventor: Maomi Katsumata, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 131 days.

(21) Appl. No.: 13/779,740

(22) Filed: Feb. 27, 2013

(65) Prior Publication Data
US 2013/0258540 A1  Oct. 3, 2013

(30) Foreign Application Priority Data
Mar. 29, 2012 (JP) .................................. 2012-077762

(51) Int. Cl.
*H02H 9/02* (2006.01)
*G05F 1/573* (2006.01)

(52) U.S. Cl.
CPC ............. *H02H 9/025* (2013.01); *G05F 1/5735* (2013.01)

(58) Field of Classification Search
CPC .............................. H02H 9/025; G05F 1/5735
USPC ......................................................... 361/101
See application file for complete search history.

(56) References Cited

U.S. PATENT DOCUMENTS

| 2006/0113978 A1* | 6/2006 | Suzuki | 323/282 |
| 2006/0133000 A1* | 6/2006 | Kimura | 361/93.1 |
| 2007/0108949 A1 | 5/2007 | Ohoka | |

FOREIGN PATENT DOCUMENTS

| JP | 2002-169618 A | 6/2002 |
| JP | 2007-133730 A | 5/2007 |
| JP | 2009-123244 A | 6/2009 |

OTHER PUBLICATIONS

Japanese Office Action dated Jun. 27, 2014 in counterpart Japanese Application No. 2012-077762.
Chinese Office Action dated Aug. 21, 2014 in counterpart Chinese Application No. 201310074658.2.

* cited by examiner

*Primary Examiner* — Scott Bauer
(74) *Attorney, Agent, or Firm* — Holtz, Holtz, Goodman & Chick PC

(57) ABSTRACT

According to one embodiment, an overcurrent protection circuit for controlling an output transistor connected between a power source and an output terminal is provided. The overcurrent protection circuit has an overcurrent limiting circuit, a current-voltage control circuit, and a first control circuit. The current-voltage control circuit configured to control a gate voltage of the output transistor so that an output current is proportional to an output voltage of the output terminal Tout. The first control circuit is configured to allow the current-voltage control circuit to control the output transistor so that the output current is proportional to the output voltage when the output voltage is equal to or lower than a predetermined threshold voltage. The first control circuit is configured to allow the current-voltage control circuit to stop controlling the output transistor when the output voltage exceeds the threshold voltage.

20 Claims, 7 Drawing Sheets

OVERCURRENT PROTECTION CIRCUIT AND POWER SUPPLY DEVICE

CROSS-REFERENCE TO RELATED APPLICATION

This application is based upon and claims the benefit of priority from the prior Japanese Patent Application No. 2012-77762 filed on Mar. 29, 2012, the entire contents of which are incorporated herein by reference.

FIELD

Embodiments described herein relate generally to an overcurrent protection circuit and a power supply device

BACKGROUND

An overcurrent protection circuit which protects a circuit element from an overcurrent is known. This kind of overcurrent protection circuit and a power supply device using the overcurrent protection circuit are required to have sufficient protection operating performance.

DETAILED DESCRIPTION

Figure 1:
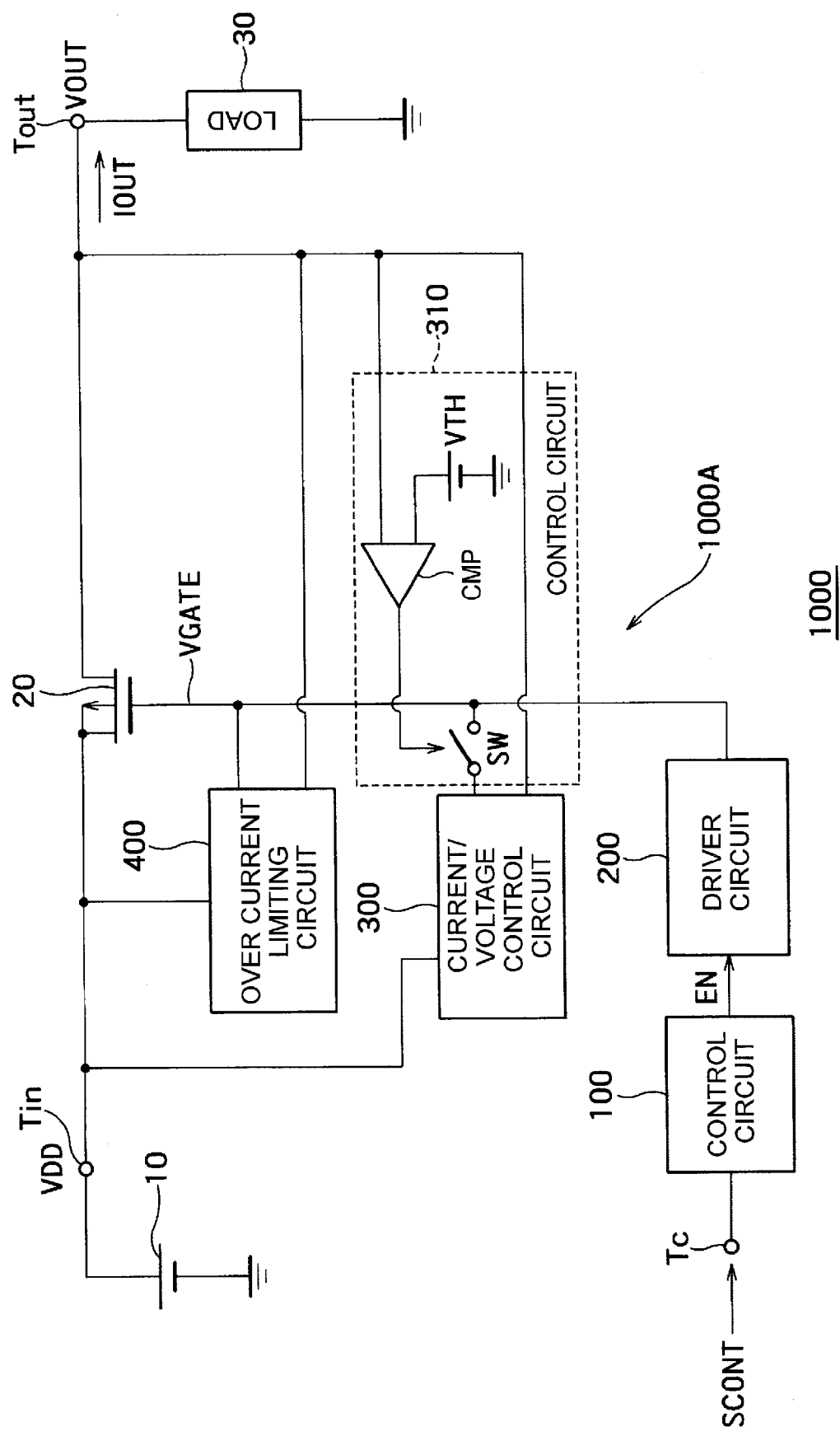
FIG. 1 is a block diagram showing an example of a configuration of a power supply device according to an embodiment.

According to one embodiment, an overcurrent protection circuit for controlling an output transistor connected between a power source and an output terminal is provided. The overcurrent protection circuit has an overcurrent limiting circuit, a current-voltage control circuit, and a first control circuit.

The overcurrent limiting circuit is configured to control a gate voltage of the output transistor so that the output transistor is used in a linear operation when an output current at the output terminal is lower than a limited overcurrent value. The overcurrent limiting circuit controls the gate voltage of the output transistor so as to maintain the output current at the limited overcurrent value when the output current reaches the limited overcurrent value.

The current-voltage control circuit is configured to control the gate voltage of the output transistor so that the output current is proportional to the output voltage at the output terminal. The first control circuit is configured to allow the current-voltage control circuit to control the output transistor so that the output current is proportional to the output voltage when the output voltage is equal to or lower than a predetermined threshold voltage. The first control circuit is configured to allow the current-voltage control circuit to stop controlling the output transistor when the output voltage exceeds the threshold voltage.

Hereinafter, a further embodiment will be described with reference to the drawings.

In the drawings, the same reference numerals denote the same or similar portions, respectively.

In the following embodiment, a case where a transistor of a first conductive type is a p-channel field effect transistor (hereinafter, referred to as a "p-channel MOS transistor") and a transistor of a second conductive type is an n-channel field effect transistor (hereinafter, referred to as an n-channel MOS transistor") will be described.

FIG. 1 is a block diagram showing an example of a configuration of a power supply device according to the embodiment.

As shown in FIG. 1, the power supply device 1000 includes an output transistor of a first conductive type (a p-channel MOS transistor) 20, a control circuit 310 serving as a first control circuit, a control circuit 100 serving as a second control circuit, a driver circuit 200, a current-voltage control circuit 300, and an overcurrent limiting circuit 400.

A power source 10 is connected between a power source terminal Tin and a ground so as to output a power source voltage VDD.

A load 30 is connected between an output terminal Tout and the ground, and has an impedance ZL.

The output transistor 20 is connected between the power source terminal Tin and the output terminal Tout.

The current-voltage control circuit 300, the control circuit 310 and the overcurrent limiting circuit 400 compose an overcurrent protection circuit 1000A. The overcurrent protection circuit 1000A controls the output transistor 20 which is connected between the power source terminal Tin and the output terminal Tout.

The control circuit 100 outputs an enable signal EN in accordance with a control signal SCONT which is input through a control terminal Tc from the outside.

The driver circuit 200 supplies a driving voltage to a gate of the output transistor 20 in accordance with the enable signal EN.

When an output current IOUT which is output from the output terminal Tout is lower than a predetermined overcurrent limiting current value, the overcurrent limiting circuit 400 controls a gate voltage of the output transistor 20 so as to operate the output transistor 20 in a linear area.

On the other hand, when the output current IOUT reaches the limited overcurrent value, the overcurrent limiting circuit 400 controls the gate voltage of the output transistor 20 to control the output transistor 20 so as to maintain the output current IOUT at the limited overcurrent value.

The current-voltage control circuit 300 controls the gate voltage of the output transistor 20.

By the control, the output transistor 20 is controlled so that the output current IOUT is proportional to the output voltage VOUT of the output terminal Tout.

When the output voltage VOUT is equal to or lower than a predetermined threshold voltage VTH, the control circuit 310 allows the current-voltage control circuit 300 to control the output transistor 20 so that the output current IOUT is proportional to the output voltage VOUT.

In contrast, when the output voltage VOUT is higher than the threshold voltage VTH, the control circuit 310 allows the current-voltage control circuit 300 to stop controlling the output transistor 20.

The control circuit 310, as shown in FIG. 1, includes a switch circuit SW and a comparator CMP, for example.

The switch circuit SW is connected between an output portion of the overcurrent limiting circuit 400 which controls the gate voltage of the output transistor 20, and the gate of the output transistor 20.

The comparator CMP compares the output voltage VOUT and the threshold voltage VTH. When the output voltage VOUT is equal to or lower than the threshold voltage VTH, the comparator CMP turns on the switch circuit SW. By turning on of the switch circuit SW, the current-voltage control circuit 300 controls the output transistor 20 so that the output current IOUT is proportional to the output voltage VOUT.

When the output voltage VOUT is higher than the threshold voltage VTH, the comparator CMP turns off the switch circuit SW. By turning off the switch circuit SW, the current-voltage control circuit 300 stops controlling the output transistor 20.

As will be described below, the control circuit 310 may have a different circuit configuration which indicates the same function.

Figure 2:
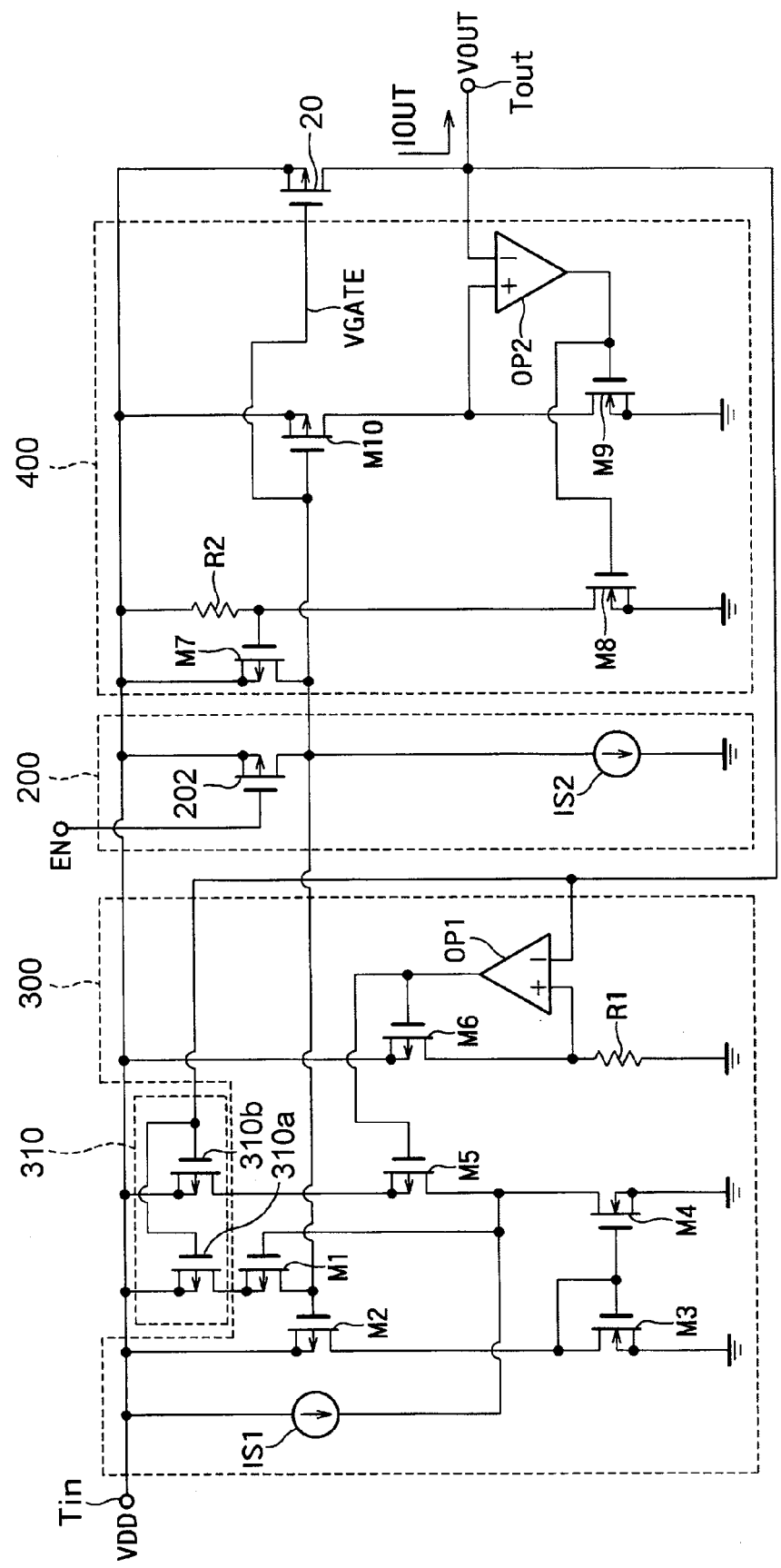
FIG. 2 is a circuit diagram showing a first example of a circuit configuration including the overcurrent protection circuit which has an overcurrent limiting circuit, a current-voltage control circuit and a control circuit, a driver circuit, and an output transistor respectively shown in FIG. 1.

FIG. 2 is a circuit diagram showing a first example of a circuit configuration including the overcurrent protection circuit 1000A which has the overcurrent limiting circuit 400, the current-voltage control circuit 300 and the control circuit 310, the driver circuit 200, and the output transistor 20 respectively shown in FIG. 1.

As shown in FIG. 2, the control circuit 310 is provided with a control transistor of a first conductive type (a p-channel MOS transistor) 310a and a control transistor of a first conductive type (a p-channel MOS transistor) 310b. The configuration is different from the example of FIG. 1.

A source and a drain of the control transistor 310a are connected to the power source terminal Tin and the gate of the output transistor 20, respectively. A gate of the control transistor 310a is connected to the output terminal Tout.

A source and a drain of the control transistor 310b are connected to the power source terminal Tin and a drain of an MOS transistor M4, respectively. Specifically, the control transistor 310b is connected to an MOS transistor M5 in series and between the power source terminal Tin and the drain of the MOS transistor M4. A gate of the control transistor 310b is connected to the gate of the control transistor 310a.

The current/voltage control circuit 300, as shown in FIG. 2, is provided with a MOS transistor of the first conductive type (a p-channel MOS transistor) M1, a MOS transistor of the first conductive type (a p-channel MOS transistor) M2, a MOS transistor of the second conductive type MOS transistor (a n-channel MOS transistor) M3, a MOS transistor of the second conductive type (a n-channel MOS transistor) M4, a MOS transistor of the first conductive type (a p-channel MOS transistor) M5, a MOS transistor of the first conductive type (a p-channel MOS transistor) M6, a resistor R1, an operational amplifier OP1, and a first constant current source IS1.

A source and a drain of the MOS transistor M1 are connected to the power source terminal Tin and the gate of the output transistor 20, respectively. Specifically, the MOS transistor M1 is connected to the first control transistor 310a in series and between the power source terminal Tin and the gate of the output transistor 20.

A source of the MOS transistor M2 is connected to the power source terminal Tin. A gate of the MOS transistor M2 is connected to the gate of the output transistor 20. A drain of the MOS transistor M2 is connected to a drain of the MOS transistor M3. A size of the MOS transistor M2 is 1/m times the size of the output transistor 20, for example. m is a positive integer.

A source of the MOS transistor M3 is connected to the ground. A drain and a gate of the MOS transistor M3 are connected and the MOS transistor M3 is connected to serve as a diode.

A drain of the MOS transistor M4 is connected to the gate of the MOS transistor M1, a source of the MOS transistor M4 is connected to the ground, and a gate of the MOS transistor M4 is connected to the gate of the MOS transistor M3.

A source and a drain of the MOS transistor M5 are connected to the power source terminal Tin and the drain of the MOS transistor M4, respectively.

A source of the MOS transistor M6 is connected to the power source terminal Tin and a gate of the MOS transistor M6 is connected to the gate of the MOS transistor M5.

The resistor R1 is connected between the drain of the MOS transistor M6 and the ground.

An inverted signal input terminal of the operational amplifier OP1 is connected to the output terminal Tout, a non-inverted signal input terminal of the operational amplifier OP1 is connected to the drain of the MOS transistor M6, and an output terminal of the operational amplifier OP1 is connected to the gates of the MOS transistors M5, M6. The operational amplifier OP1 controls the gate voltages of the MOS transistors M5, M6 so that a voltage of the drain of the MOS transistor M6 is equal to the output voltage VOUT.

The constant current source IS1 is connected to the power source terminal Tin and the drain of the MOS transistor M5 to output a constant current ISC.

The overcurrent limiting circuit 400, as shown in FIG. 2, for example, is provide with a MOS transistor of a first conductive type (a p-channel MOS transistor) M7, a MOS transistor of a second conductive type (a n-channel MOS transistor) M8, a MOS transistor of a second conductive type (a n-channel MOS transistor) M9, a MOS transistor of a first conductive type (a p-channel MOS transistor) M10, a resistor R2, and an operational amplifier OP2.

A source of the MOS transistor M7 is connected to the power source terminal Tin and a drain of the MOS transistor M7 is connected to the gate of the output transistor 20.

The resistor R2 is connected to the power source terminal Tin and a gate of the MOS transistor M7.

A drain of the MOS transistor M8 is connected to the gate of the MOS transistor M7 and a source of the MOS transistor M8 is connected to the ground.

A source of the MOS transistor M9 is connected to the ground and a gate of the MOS transistor M9 is connected to a gate of the eighth MOS transistor M8.

A source of the MOS transistor M10 is connected to the power source terminal Tin, a drain of the MOS transistor M10 is connected to the drain of the MOS transistor M9, and a gate of the MOS transistor M10 is connected to the gate of the output transistor 20. A size of the MOS transistor M10 is 1/n times the size of the output transistor 20, for example. n is a positive integer.

An non-inverted signal input terminal of the operational amplifier OP2 is connected to the drain of the MOS transistor M10, an inverted signal input terminal of the operational amplifier OP2 is connected to the output terminal Tout, and an output terminal of the operational amplifier OP2 is connected to the gates of the MOS transistors M8, M9. The operational amplifier OP2 controls a gate voltage of the MOS transistor M9 so that a voltage of the drain of the MOS transistor M6 is equal to the output voltage VOUT.

In the example of FIG. 2, a control transistor 310a is connected between the source of the MOS transistor M1 and the power source terminal Tin. Instead of the connection, the control transistor 310a may be connected between the drain of the MOS transistor M1 and the gate of the output transistor 20.

The control transistor 310b is connected between the source of the MOS transistor M5 and the power source terminal Tin. Instead of the connection, the control transistor 310b may be connected between the drain of the MOS transistor M5 and the drain of the MOS transistor M4.

The driver circuit 200, as shown in FIG. 2, for example, is provided with a driving transistor (a p-channel MOS transistor) 202 and a constant current source IS2.

A source of the driving transistor 202 is connected to the power source terminal Tin, a drain of the driving transistor 202 is connected to the gate of the output transistor 20, and a gate of the driving transistor 202 is supplied with an enable signal EN.

The constant current source IS2 is connected to the drain of the driving transistor 202 and the ground, and outputs a constant current.

When the enable signal EN becomes a "Low" level, the driving transistor 202 is turned on and supplies a "High" level gate voltage to the gate of the output transistor 20. Accordingly, the output transistor 20 is turned off.

When the enable signal EN becomes a "High" level, the driving transistor 202 is turned off and supplies a "Low" level gate voltage to the gate of the output transistor 20. Accordingly, the output transistor 20 is turned on.

Figure 3:
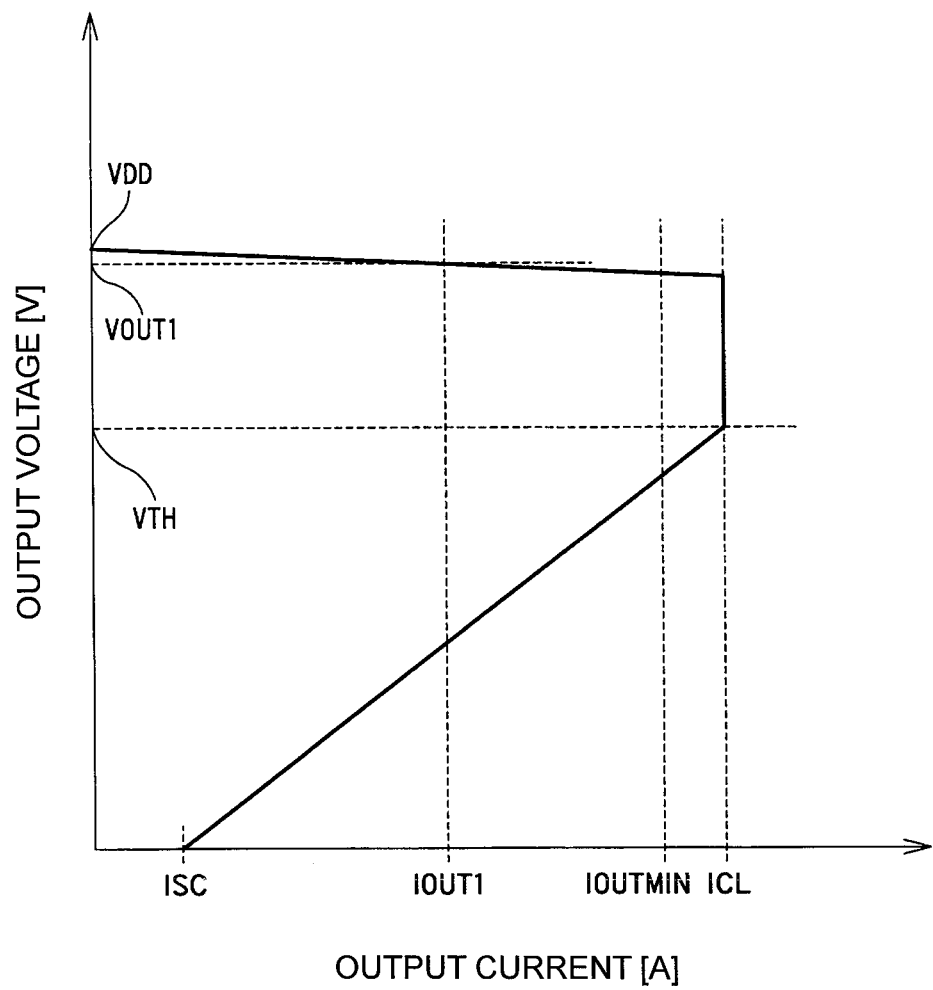
FIG. 3 is a characteristic diagram showing an example of a relationship between an output voltage and an output current of the power supply device shown in FIG. 1.

An example of an operation characteristic of the power supply device 1000 which has the above-described configuration will be described. FIG. 3 is a characteristic diagram showing an example of a relationship between an output voltage VOUT and an output current IOUT of the power supply device 1000 shown in FIG. 1.

In FIG. 3, a current which arises when a short circuit occurs is denoted by ISC, and a limited overcurrent value is denoted by ICL. The limited overcurrent value ICL needs to be larger than the maximum output current IOUTMAX defined by a specification of a load switch. An on-resistance RON of the output transistor 20 is represented by the following equation using an output voltage VOUT1 which is obtained when an output current IOUT1 defined by a specification is provided. This resistor RON is one of the important specifications of the load switch.

$$RON=(VDD-VOUT1)/IOUT1$$

A normal operation i.e. a state arising when the overcurrent protection circuit 1000A does not operate will be described.

At the time of the normal operation, the gate of the output transistor 20 is driven by the driving transistor 202 and the constant current source IS2 of the driver circuit 200. This operation, as described above, is controlled by the enable signal EN generated in the control circuit 100 of FIG. 1 from the control signal SCONT which is input to the control terminal Tc.

When the enable signal EN is a High logic, the output transistor 20 is turned on. In contrast, when the enable signal EN is a Low logic, the output transistor 20 is turned off.

An operation of the overcurrent limiting circuit 400 will be described.

For example, when an output current IOUT which flows from the output transistor 20 to the load 30 in FIG. 1 is increased, the drain voltage of the output transistor 20 i.e. the output voltage VOUT is dropped.

The operational amplifier OP2 controls the drain voltage of the MOS transistor M10 so that the drain voltage is equal to the output voltage VOUT. By this control, an output current IOUT/n flows in the MOS transistor M10 whose size ratio is 1/n times that of the output transistor 20.

When the output voltage VOUT is dropped as the output current IOUT is increased, the drain voltage of the MOS transistor M10 is dropped so that the drain current IOUT/n which flows in the MOS transistor M10 is increased.

The MOS transistors M8, M9 form a current mirror circuit. Accordingly, the gate voltage of the MOS transistor M7 is dropped by the voltage drop caused by the resistor R2 in accordance with a mirror current which flows in the MOS transistor M8.

When the MOS transistor M7 is turned on by dropping the gate voltage, the gate voltage VGATE of the output transistor 20 is increased to limit the current.

At this time, the output current IOUT becomes equal to the limited overcurrent value ICL.

The limited overcurrent value ICL may be determined by a voltage between the gate and the source of the MOS transistor M7 which is generated by the resistor R2, and the overcurrent protection circuit 1000A may operate even at a low power source voltage.

An operation of the current-voltage control circuit 300 will be described.

For example, the output voltage VOUT is dropped by the operation of the overcurrent limiting circuit 400. The drain voltage of the MOS transistor M6 is controlled by the operational amplifier OP1 so that the drain voltage is equal to the output voltage VOUT. By the control, a current VOUT/R1 which is proportional to the output voltage VOUT flows in the resistor R1.

The MOS transistor M2 has a size ratio which is 1/m times the size ratio of the output transistor 20, for example. In this case, a drain current of the MOS transistor M2 is a current IOUT/m which is 1/m times the current of the output current IOUT.

The MOS transistors M3, M4 and the MOS transistors M5, M6 form current mirror circuits, respectively. In this case, an arbitrary current ratio (a mirror ratio) may be set.

The MOS transistor M1 controls the gate voltage of the output transistor 20 so that the current flowing in the MOS transistor M4 is equal to the current flowing in the MOS transistor M5.

When the output voltage VOUT is further dropped, the current of the MOS transistor M5 is further decreased. A gate voltage of the MOS transistor M1 is dropped so that the current flowing in the MOS transistor M5 is equal to the current flowing in the MOS transistor M4. The gate voltage of the output transistor 20 rises by dropping the gate voltage. As a result, the output current IOUT is decreased.

A current which arises when the output voltage VOUT is 0 V, i.e., a current ISC arises when a short circuit occurs is generated by the constant current source IS1.

When the output voltage VOUT which is dropped by the overcurrent limiting circuit 400 is lower than the threshold voltage VTH of the comparator CMP, the control transistors 310a, 310b are turned on. When the control transistors 310a, 310b are turned on, the current-voltage control circuit 300 controls the output transistor 20.

On the other hand, when the output voltage VOUT is higher than the threshold voltage VTH for the comparator CMP, the control transistors 310a, 310b are turned off. When the control transistors 310a, 310b are turned off, the current-voltage control circuit 300 stops controlling the output transistor 20.

In this case, the threshold voltage VTH is a value obtained by subtracting a threshold voltage of the control transistors 310a, 310b from the power source voltage VDD.

By the operation of the power supply device 1000 described above, as shown in FIG. 3, it is possible to reduce an influence of the protection operation on a load regulation, i.e., a ratio of variation in the output voltage with respect to a variation in the output current.

Further, the overcurrent limiting circuit 400 and the current-voltage control circuit 300 may be independently designed so that a man-hour in the design, the circuit area and a cost reduce.

Figure 4:
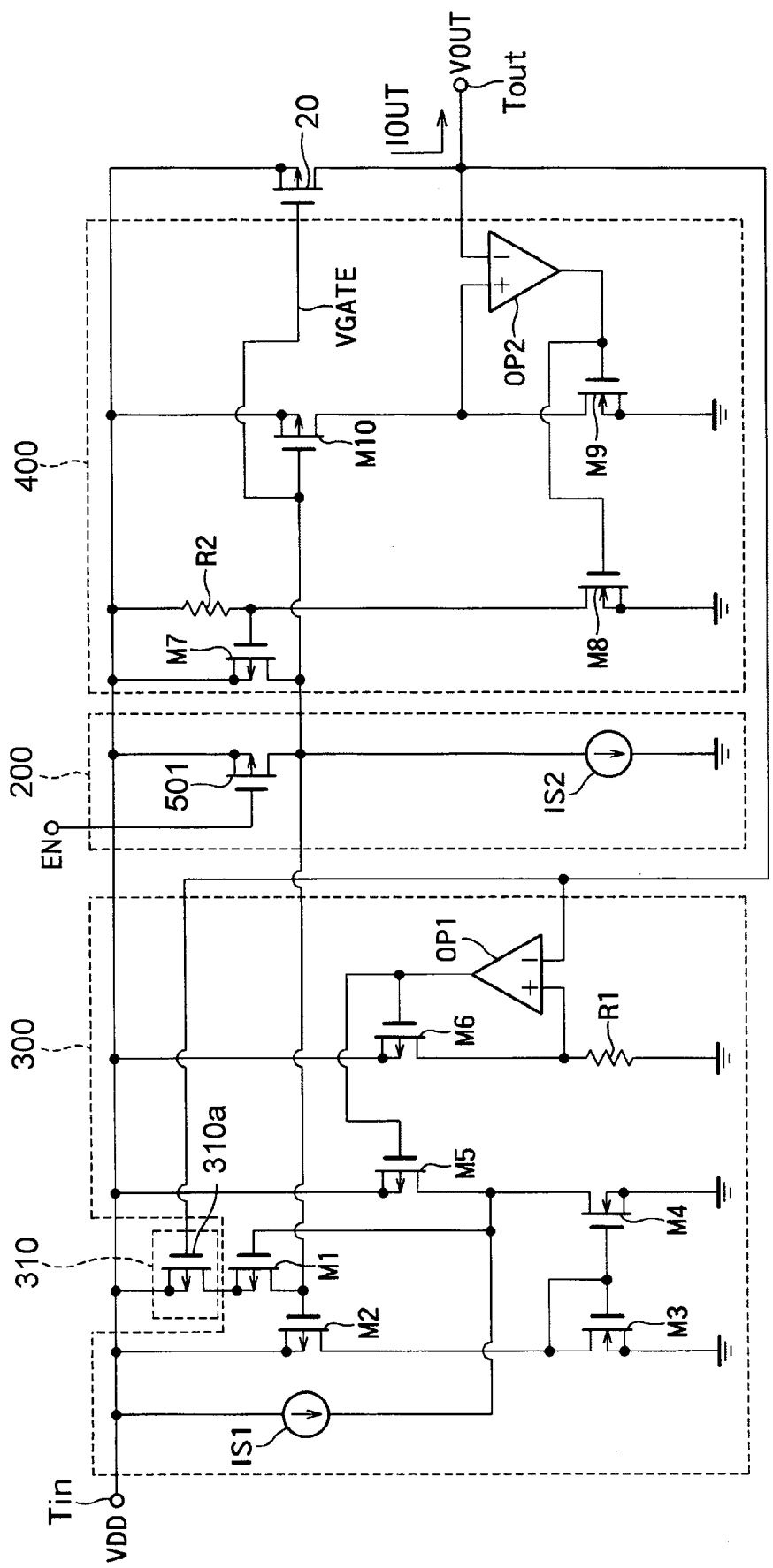
FIG. 4 is a circuit diagram showing a second example of the circuit configuration including the overcurrent protection circuit, the driver circuit, and the output transistor shown in FIG. 1.

FIG. 4 is a circuit diagram showing a second example of a circuit configuration which includes the overcurrent protection circuit 1000A, the driver circuit 200, and the output transistor 20 respectively shown in FIG. 1. The circuit configuration other than the control circuit 310 is similar to that of the circuit of FIG. 2.

As shown in FIG. 4, the control circuit 310 has a control transistor (a p-channel MOS transistor) 310a.

In the control circuit 310 of the example, the control transistor (a p-channel MOS transistor) 310b shown in FIG. 2 is omitted.

When the output voltage VOUT which is dropped by the current limiting circuit 400 is lower than the threshold voltage VTH, the control transistor 310a is turned on.

When the control transistor 310a is switched on, similarly to the example shown in FIG. 2, the current-voltage control circuit 300 controls the output transistor 20.

On the other hand, when the output voltage VOUT is higher than the threshold voltage VTH, the control transistor 310a is turned off. When the control transistor 310a is switched off, similarly to the example shown in FIG. 2, the current-voltage control circuit 300 stops controlling the output transistor 20.

The configuration, function and operation of the power supply device other than those of FIG. 4 are similar to those of the power supply device of the embodiment.

According to the power supply device shown in FIG. 4, it is possible to reduce the influence of the protection operation of the power supply device on a load regulation.

Figure 5:
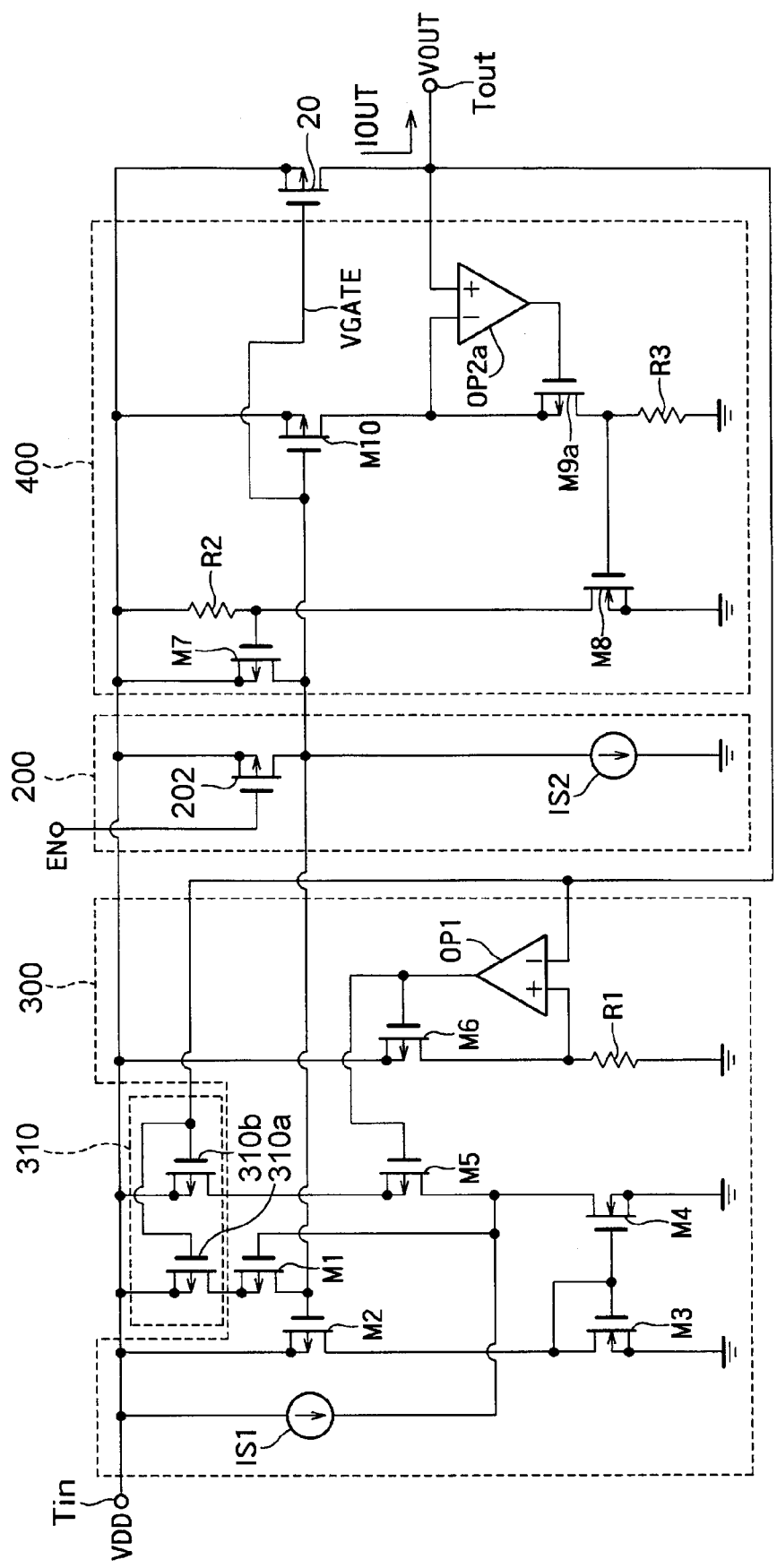
FIG. 5 is a circuit diagram showing a third example of the circuit configuration including the overcurrent protection circuit, the driver circuit, and the output transistor shown in FIG. 1.

FIG. 5 is a circuit diagram showing a third example of a circuit configuration which includes the overcurrent protection circuit 1000A, the driver circuit 200 and the output transistor 20 respectively shown in FIG. 1. The circuit configuration other than the overcurrent limiting circuit 400 is similar to that of the circuit of FIG. 2.

In this example, the overcurrent limiting circuit 400, as shown in FIG. 5, includes an MOS transistor (a p-channel MOS transistor) M7, an MOS transistor (a n-channel MOS transistor) M8, an MOS transistor (a n-channel MOS transistor) M9a, an MOS transistor (a p-channel MOS transistor) M10, a resistor R2, a resistor R3, and an operational amplifier OP2a.

The resistor R3 is connected between a gate of the MOS transistor M8 and the ground.

A drain of the MOS transistor M9a is connected to the gate of the MOS transistor M8.

A source of the MOS transistor M10 is connected to the power source terminal Tin, a drain of the MOS transistor M10 is connected to the source of the MOS transistor M9a, and a gate of the MOS transistor M10 is connected to the gate of the output transistor 20.

An inverted signal input terminal of the operational amplifier OP2a is connected to the drain of the MOS transistor M10, a non-inverted signal input terminal of the operational amplifier OP2a is connected to the output terminal Tout, and an output terminal of the operational amplifier OP2a is connected to the gate of the MOS transistor M9. The operational amplifier OP2a controls a gate voltage of the MOS transistor M9a so that a voltage of the drain of the MOS transistor M10 is equal to the output voltage VOUT.

In the operation of the overcurrent limiting circuit 400, the drain voltage of the MOS transistor M10 whose size is 1/n times the size of the output transistor 20 is controlled to be equal to the output voltage VOUT by the operational amplifier OP2a.

By this control, a drain current of the MOS transistor M10 is a current which is 1/n times the current of the output current IOUT. As the output current IOUT is increased, the current which flows in the resistor R3 is increased so that the gate voltage of the MOS transistor M8 rises.

When the output current IOUT is equal to the limited overcurrent value ICL and the MOS transistor M8 is turned on, the gate voltage of the output transistor 20 is risen by the function of MOS transistor M7 and the resistor R2. The current of the output transistor 20 is limited by the rising of the gate voltage.

The limited overcurrent value ICL can be determined by the value of the resistor R3 and the voltage between the gate and the source of the MOS transistor M8.

The configuration, function and operation of the power supply device other than the configuration shown in FIG. 5 are similar to those of the power supply device of FIG. 1.

According to the power supply device of FIG. 5, it is possible to reduce the influence of the protection operation on a load regulation.

Figure 6:
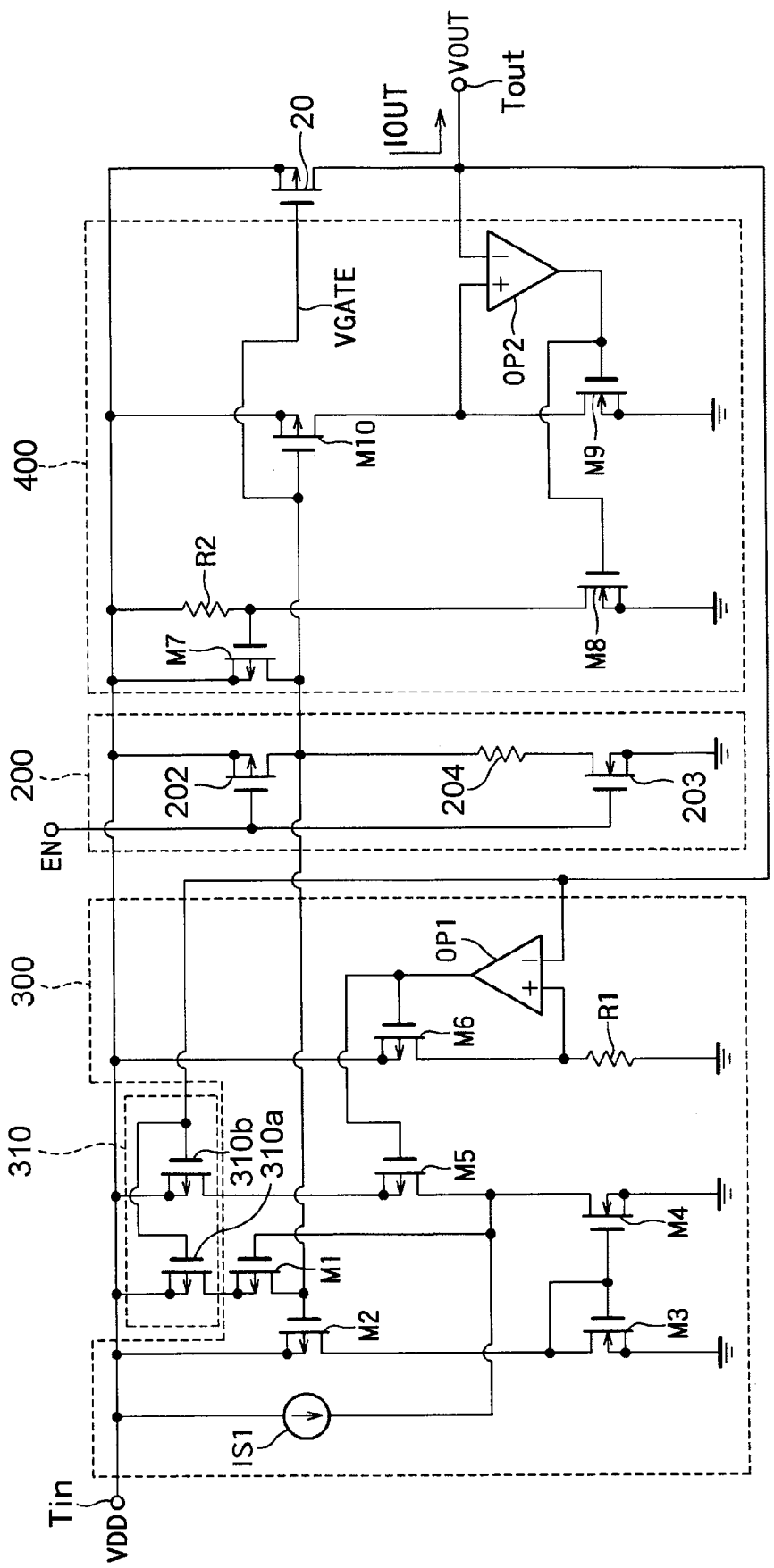
FIG. 6 is a circuit diagram showing a fourth example of the circuit configuration including the overcurrent protection circuit, the driver circuit, and the output transistor shown in FIG. 1.

FIG. 6 is a circuit diagram showing a fourth example of a circuit configuration which includes the overcurrent protection circuit 1000A, the driver circuit 200 and the output transistor 20 respectively shown in FIG. 1. The circuit configuration other than the driver circuit 200 is similar to that of the circuit of FIG. 2.

As shown in FIG. 6, the driver circuit 200 is provided with a driving transistor (a p-channel MOS transistor) 202, a driving transistor (a n-channel MOS transistor) 203, and a resistor 204.

A source of the driving transistor 202 is connected to the power source terminal Tin. A drain of the driving transistor 202 is connected to the gate of the output transistor 20 and one end of the resistor 204. An enable signal EN is supplied to a gate of the driving transistor 202.

A drain of the driving transistor 203 is connected to the other end of the resistor 204. A source of the driving transistor 203 is connected to the ground. The enable signal EN is supplied to a gate of the driving transistor 203.

The driver circuit 200 has a structure of a CMOS inverter.

For example, when the enable signal EN becomes a "Low" level, the driving transistor 202 is turned on and the driving transistor 203 is turned off. As a result, a "High" level gate voltage is supplied to the gate of the output transistor 20.

Supplying the "High" level gate voltage turns off the output transistor 20.

On the other hand, when the enable signal EN becomes a "High" level, the driving transistor 202 is turned off and the driving transistor 203 is turned on. As a result, a "Low" level gate voltage is supplied to the gate of the output transistor 20. Supplying the "Low" level gate voltage turns on the output transistor 20.

The configuration, function and operation of the power supply device other than those of FIG. 6 are similar to those of the power supply device of FIG. 1.

According to the power supply device of FIG. 6, it is possible to reduce the influence of the protection operation on a load regulation.

Figure 7:
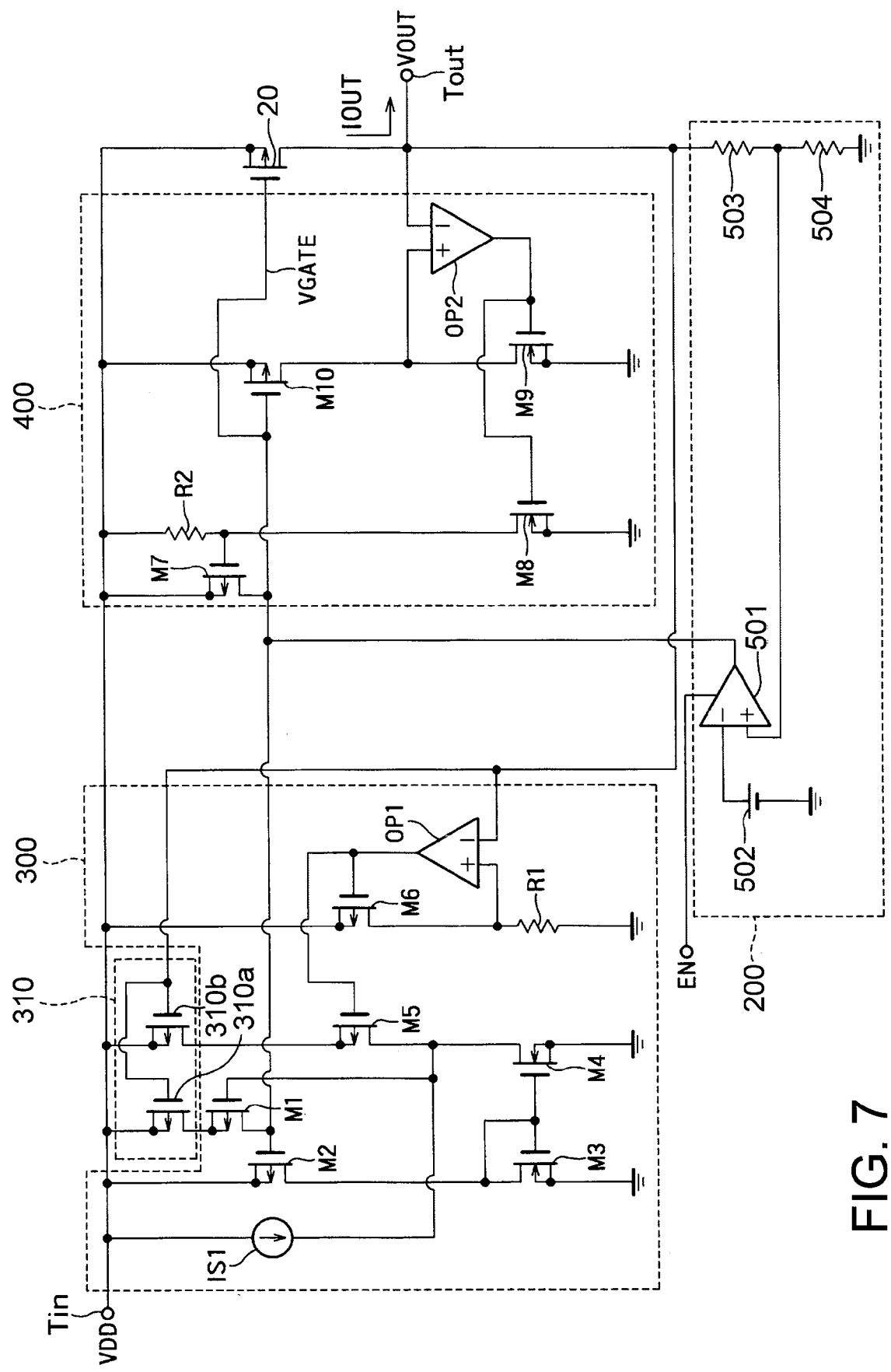
FIG. 7 is a circuit diagram showing a fifth example of the circuit configuration including the overcurrent protection circuit, the driver circuit, and the output transistor shown in FIG. 1.

FIG. 7 is a circuit diagram showing a fifth example of a circuit configuration which includes the overcurrent protection circuit 1000A, the driver circuit 200 and the output transistor 20 respectively shown in FIG. 1. The circuit configuration other than the driver circuit 200 is similar to that of the circuit of FIG. 2.

As shown in FIG. 7, the driver circuit 200 is provided with a voltage dividing circuit having resistors 503, 504, a reference voltage generating circuit 502, and an error amplifier 501. The resistors 503, 504 are connected in series with each other.

The voltage dividing circuit having the resistors 503, 504 outputs a divided voltage obtained by voltage-dividing the output voltage VOUT.

The reference voltage generating circuit 502 generates a reference voltage.

The error amplifier 501 supplies a driving voltage (a gate voltage) to the gate of the output transistor 20 so that the divided voltage is equal to the reference voltage. The error amplifier 501 is activated by the enable signal EN.

The driver circuit 200 has a feedback loop.

The configuration, function and operation of the power supply device other than the circuit configuration shown in FIG. 7 are similar to those of the power supply device of the embodiment of FIG. 1.

According to the power supply device of FIG. 7, it is possible to reduce the influence of the protection operation on a load regulation.

While a certain embodiment has been described, the embodiment has been presented by way of example only, and is not intended to limit the scope of the invention. Indeed, the novel embodiment described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the invention.

What is claimed is:

1. An overcurrent protection circuit for controlling an output transistor connected between a power source terminal for supplying a voltage and an output terminal, comprising:

an overcurrent limiting circuit which is connected with the power source terminal, the output terminal, and a gate of the output transistor, and which is configured to control a gate voltage of the output transistor so that the output transistor is used in a linear operation when an output current at the output terminal is lower than a limited overcurrent value, and so as to maintain the output current at the limited overcurrent value when the output current reaches the limited overcurrent value;

a current-voltage control circuit which is connected with the power source terminal and the output terminal and which is configured to control the gate voltage of the output transistor, so that the output current is proportional to the output voltage at the output terminal; and a first control circuit which is connected with the power source terminal, the output terminal, and the current-voltage control circuit, and which is configured to allow the current-voltage control circuit to control the output transistor so that the output current is proportional to the output voltage when the output voltage is equal to or lower than a predetermined threshold voltage, the first control circuit configured to allow the current-voltage control circuit to stop controlling the output transistor when the output voltage exceeds the threshold voltage.

2. A circuit according to claim 1, wherein the first control circuit includes a first control transistor of a first conductive type which is combined between the power source terminal and the gate of the output transistor and has a gate connected to the output terminal which is connected to the output transistor, and the current-voltage control circuit includes:

a first MOS transistor of the first conductive type which is connected to the first control transistor in series and is connected between the power source terminal and the gate of the output transistor;

a second MOS transistor of the first conductive type having a source connected to the power source terminal and a gate connected to the gate of the output transistor;

a third MOS transistor of a second conductive type having a drain connected to a drain of the second MOS transistor and a source connected to the ground, the third MOS transistor being connected to serve as a diode connection;

a fourth MOS transistor of a second conductive type having a drain connected to a gate of the first MOS transistor, a source connected to the ground, and a gate connected to a gate of the third MOS transistor;

a fifth MOS transistor of the first conductive type connected between the power source terminal and the drain of the fourth MOS transistor;

a sixth MOS transistor of the first conductive type having a source connected to the power source terminal and a gate connected to a gate of the fifth MOS transistor;

a first resistor connected between a drain of the sixth MOS transistor and the ground; and a first operational amplifier having an inverted signal input terminal, a non-inverted signal input terminal, and an output terminal to control gate voltages of the fifth and sixth MOS transistors so that a voltage of the drain of the sixth MOS transistor is equal to the output voltage, the inverted signal input terminal being connected to the output terminal, the non-inverted signal input terminal being connected to the drain of the sixth MOS transistor, and the output terminal of the first operational amplifier being connected to the gates of the fifth and sixth MOS transistors.

3. A circuit according to claim 2, wherein the first control circuit is provided with a second control transistor of the first conductive type, the second control transistor is connected to the fifth MOS transistor in series and combined between the power source terminal and the drain of the fourth MOS transistor, and a gate of the second control transistor is connected to the gate of the first control transistor.

4. A circuit according to claim 2, wherein the current-voltage control circuit further includes a first constant current source which is connected between the power source terminal and a drain of the fifth MOS transistor and outputs a constant current.

5. A circuit according to claim 3, wherein the current-voltage control circuit further includes a first constant current source which is connected between the power source terminal and a drain of the fifth MOS transistor and outputs a constant current.

6. A circuit according to claim 2, wherein the overcurrent limiting circuit includes:

a seventh MOS transistor of the first conductive type having a source connected to the power source terminal and a drain connected to the gate of the output transistor;
a second resistor connected between the power source terminal and a gate of the seventh MOS transistor;
an eighth MOS transistor of the second conductive type having a drain connected to the gate of the seventh MOS transistor and a source connected to the ground;
a ninth MOS transistor of the second conductive type having a source connected to the ground and a gate connected to a gate of the eighth MOS transistor;
a tenth MOS transistor of the first conductive type having a source connected to the power source terminal, a drain connected to a drain of the ninth MOS transistor, and a gate connected to the gate of the output transistor; and
a second operational amplifier having an inverted signal input terminal, a non-inverted signal input terminal, and an output terminal to control a gate voltage of the ninth MOS transistor so that a voltage of the drain of the tenth MOS transistor is equal to the output voltage, the non-inverted signal input terminal being connected to the drain of the tenth MOS transistor, the inverted signal input terminal being connected to the output terminal, and the output terminal of the second operational amplifier being connected to the gates of the eighth and ninth MOS transistors.

7. A circuit according to claim 3, wherein the overcurrent limiting circuit includes:
a seventh MOS transistor of the first conductive type having a source connected to the power source terminal and a drain connected to the gate of the output transistor;
a second resistor connected between the power source terminal and a gate of the seventh MOS transistor;
an eighth MOS transistor of the second conductive type having a drain connected to the gate of the seventh MOS transistor and a source connected to the ground;
a ninth MOS transistor of the second conductive type having a source connected to the ground and a gate connected to a gate of the eighth MOS transistor;
a tenth MOS transistor of the first conductive type having a source connected to the power source terminal, a drain connected to a drain of the ninth MOS transistor, and a gate connected to the gate of the output transistor; and
a second operational amplifier having an inverted signal input terminal, a non-inverted signal input terminal, and an output terminal to control a gate voltage of the ninth MOS transistor so that a voltage of the drain of the tenth MOS transistor is equal to the output voltage, the non-inverted signal input terminal being connected to the drain of the tenth MOS transistor, the inverted signal input terminal being connected to the output terminal, and the output terminal of the second operational amplifier being connected to the gates of the eighth and ninth MOS transistors.

8. A circuit according to claim 2, wherein the overcurrent limiting circuit includes:
a seventh MOS transistor of the first conductive type having a source connected to the power source terminal and a drain connected to the gate of the output transistor;
a second resistor connected between the power source terminal and a gate of the seventh MOS transistor;
an eighth MOS transistor of the second conductive type having a drain connected to the gate of the seventh MOS transistor and a source connected to the ground;
a third resistor connected between the gate of the eighth MOS transistor and the ground;
a ninth MOS transistor of the first conductive type having a drain connected to the gate of the eighth MOS transistor;
a tenth MOS transistor of the first conductive type having a source connected to the power source terminal, a drain connected to the source of the ninth MOS transistor, and a gate connected to the gate of the output transistor; and
a second operational amplifier having an inverted signal input terminal, a non-inverted signal input terminal, and an output terminal to control a gate voltage of the ninth MOS transistor so that a voltage of the drain of the tenth MOS transistor is equal to the output voltage, the inverted signal input terminal being connected to the drain of the tenth MOS transistor, the non-inverted signal input terminal being connected to the output terminal, and the output terminal of the second operational amplifier being connected to the gate of the ninth MOS transistor.

9. A circuit according to claim 3, wherein the overcurrent limiting circuit includes:
a seventh MOS transistor of the first conductive type having a source connected to the power source terminal and a drain connected to the gate of the output transistor;
a second resistor connected between the power source terminal and a gate of the seventh MOS transistor;
an eighth MOS transistor of the second conductive type having a drain connected to the gate of the seventh MOS transistor and a source connected to the ground;
a third resistor connected between the gate of the eighth MOS transistor and the ground;
a ninth MOS transistor of the first conductive type having a drain connected to the gate of the eighth MOS transistor;
a tenth MOS transistor of the first conductive type having a source connected to the power source terminal, a drain connected to the source of the ninth MOS transistor, and a gate connected to the gate of the output transistor; and
a second operational amplifier having an inverted signal input terminal, a non-inverted signal input terminal, and an output terminal to control a gate voltage of the ninth MOS transistor so that a voltage of the drain of the tenth MOS transistor is equal to the output voltage, the inverted signal input terminal being connected to the drain of the tenth MOS transistor, the non-inverted signal input terminal being connected to the output terminal, and the output terminal of the second operational amplifier being connected to the gate of the ninth MOS transistor.

10. An overcurrent protection circuit for controlling an output transistor connected between a power source terminal and an output terminal, comprising:
an overcurrent limiting circuit configured to control a gate voltage of the output transistor so that the output transistor is used in a linear operation when an output current at the output terminal is lower than a limited overcurrent value, and so as to maintain the output current at the limited overcurrent value when the output current reaches the limited overcurrent value;
a current-voltage control circuit configured to control the gate voltage of the output transistor, so that the output current is proportional to the output voltage at the output terminal; and
a first control circuit configured to allow the current-voltage control circuit to control the output transistor so that the output current is proportional to the output voltage when the output voltage is equal to or lower than a predetermined threshold voltage, the first control circuit configured to allow the current-voltage control circuit to stop controlling the output transistor when the output voltage exceeds the threshold voltage, wherein the first control circuit includes:
a switch circuit connected between an output portion of the current-voltage control circuit to control the gate voltage of the output transistor and the gate of the output transistor; and
a comparator comparing the output voltage of the output terminal and the threshold voltage, the comparator turning on the switch circuit when the output voltage is equal to or lower than the threshold voltage and turning off the switch circuit when the output voltage is larger than the threshold voltage.

11. A power supply device, comprising:
an output transistor of a first conductive type connected between a power source terminal for supplying a voltage and an output terminal;
an overcurrent limiting circuit which is connected with the power source terminal, the output terminal, and a gate of the output transistor, and which is configured to control a gate voltage of the output transistor so that the output transistor is used in a linear operation when an output current at the output terminal is lower than a limited overcurrent value, and so as to maintain the output current at the limited overcurrent value when the output current reaches the limited overcurrent value;
a current-voltage control circuit which is connected with the power source terminal and the output terminal and which is configured to control the gate voltage of the output transistor, so that the output current is proportional to the output voltage of the output terminal;
a first control circuit which is connected with the power source terminal, the output terminal, and the current-voltage control circuit, and which is configured to allow the current-voltage control circuit to control the output transistor so that the output current is proportional to the output voltage when the output voltage is equal to or lower than a predetermined threshold voltage and configured to allow the current-voltage control circuit to stop controlling the output transistor when the output voltage exceeds the threshold voltage; and
a driver circuit configured to supply a driving voltage to the gate of the output transistor in accordance with an enable signal.

12. A device according to claim 11, further comprising a second control circuit to output the enable signal in accordance with a control signal input through a control terminal from outside.

13. A device according to claim 11, wherein the driver circuit includes:
a first driving transistor of the first conductive type having a source connected to the power source terminal, a drain connected to a gate of the output transistor, and a gate to which the enable signal is supplied; and
a second constant current source connected between a drain of the first driving transistor and the ground for outputting a constant current.

14. A device according to claim 12, wherein the driver circuit includes:
a first driving transistor of the first conductive type having a source connected to the power source terminal, a drain connected to a gate of the output transistor, and a gate to which the enable signal is supplied; and
a second constant current source connected between a drain of the first driving transistor and the ground for outputting a constant current.

15. A device according to claim 11, wherein the driver circuit includes:
a first driving transistor of the first conductive type having a source connected to the power source terminal, a drain connected to a gate of the output transistor, and a gate to which the enable signal is supplied;
a second driving transistor of the second conductive type connected between the drain of the first driving transistor and the ground, the second driving transistor having a gate to which the enable signal is supplied; and
a resistor connected between the drain of the first driving transistor and a drain of the second driving transistor.

16. A device according to claim 12, wherein the driver circuit includes:
a first driving transistor of the first conductive type having a source connected to the power source terminal, a drain connected to a gate of the output transistor, and a gate to which the enable signal is supplied;
a second driving transistor of the second conductive type connected between the drain of the first driving transistor and the ground, the second driving transistor having a gate to which the enable signal is supplied; and
a resistor connected between the drain of the first driving transistor and a drain of the second driving transistor.

17. A device according to claim 11, wherein the driver circuit includes:
a voltage dividing circuit configured to output a divided voltage obtained by dividing the output voltage;
a reference voltage generating circuit configured to generate a reference voltage; and
an error amplifier configured to provide a driving voltage to the gate of the output transistor so that the divided voltage is equal to the reference voltage.

18. A device according to claim 12, wherein the driver circuit includes:
a voltage dividing circuit configured to output a divided voltage obtained by dividing the output voltage;
a reference voltage generating circuit configured to generate a reference voltage; and
an error amplifier configured to provide a driving voltage to the gate of the output transistor so that the divided voltage is equal to the reference voltage.

19. A device according to claim 11, wherein the first control circuit includes:
a first control transistor of the first conductive type which is combined between the power source terminal and the gate of the output transistor, the first control transistor having a gate connected to the output terminal which is connected to the output transistor, and
wherein the current-voltage control circuit includes:
a first MOS transistor of the first conductive type which is connected to the first control transistor in series and between the power source terminal and the gate of the output transistor;
a second MOS transistor of the first conductive type having a source connected to the power source terminal, and a gate connected to the gate of the output transistor;
a third MOS transistor of the second conductive type having a drain connected to a drain of the second MOS transistor and a source connected to the ground, the third MOS transistor is connected to serve as a diode;
a fourth MOS transistor of the second conductive type having a drain connected to a gate of the first MOS transistor, a source connected to the ground, and a gate connected to a gate of the third MOS transistor;

a fifth MOS transistor of the first conductive type connected between the power source terminal and the drain of the fourth MOS transistor;

a sixth MOS transistor of the first conductive type having a source connected to the power source terminal and a gate connected to a gate of the fifth transistor;

a first resistor connected between a drain of the sixth MOS transistor and the ground; and a first operational amplifier having an inverted signal input terminal, a non-inverted signal input terminal, and an output terminal to control gate voltages of the fifth and sixth MOS transistors so that a voltage of the drain of the sixth MOS transistor is equal to the output voltage, the inverted signal input terminal being connected to the output terminal, the non-inverted signal input terminal being connected to the drain of the sixth MOS transistor, and the output terminal of the first operational amplifier being connected to the gates of the fifth and sixth MOS transistors.

20. A device according to claim 19, wherein the first control circuit includes a second control transistor of the first conductive type which is connected to the fifth MOS transistor in series and combined between the power source terminal and the drain of the fourth MOS transistor, the second control transistor having a gate connected to the gate of the first control transistor.

* * * * *